US006985460B2

(12) United States Patent
Sugaya et al.

(10) Patent No.: US 6,985,460 B2
(45) Date of Patent: Jan. 10, 2006

(54) RADIO TRANSMISSION OF ISOCHRONOUS AND ASYNCHRONOUS INFORMATION IN A NETWORK HAVING A VARIABLE NUMBER OF STATIONS

(75) Inventors: Shigeru Sugaya, Kanagawa (JP); Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1015 days.

(21) Appl. No.: 09/749,324

(22) Filed: Dec. 27, 2000

(65) Prior Publication Data

US 2001/0017865 A1   Aug. 30, 2001

(30) Foreign Application Priority Data

Dec. 28, 1999   (JP) ............................... P11-374728

(51) Int. Cl.
*H04Q 7/00* (2006.01)
*H04L 12/413* (2006.01)

(52) U.S. Cl. ..................... 370/329; 370/445; 455/450
(58) Field of Classification Search ............... 370/310, 370/328, 465, 498, 351, 347, 349, 470, 321, 370/329, 336–338, 341–345, 350–442, 445, 370/447, 449, 461, 462, 509–512; 455/450, 455/453

See application file for complete search history.

(56) References Cited

U.S. PATENT DOCUMENTS

| 4,763,325 | A | * | 8/1988 | Wolfe et al. ................. 370/322 |
| 5,274,841 | A | * | 12/1993 | Natarajan et al. ........... 370/337 |
| 5,729,541 | A | * | 3/1998 | Hamalainen et al. ....... 370/337 |
| 5,768,254 | A | * | 6/1998 | Papadopoulos et al. ..... 370/201 |
| 5,970,062 | A | * | 10/1999 | Bauchot .................. 370/310.2 |
| 6,028,853 | A | * | 2/2000 | Haartsen ..................... 370/338 |
| 6,061,343 | A | * | 5/2000 | son Åkerberg .............. 370/345 |
| 6,172,971 | B1 | * | 1/2001 | Kim ........................... 370/348 |
| 6,249,515 | B1 | * | 6/2001 | Kim et al. .................. 370/337 |
| 6,275,506 | B1 | * | 8/2001 | Fazel et al. ................. 370/478 |
| 6,331,973 | B1 | * | 12/2001 | Young et al. ............... 370/337 |
| 6,377,565 | B1 | * | 4/2002 | Puckette, IV ............... 370/337 |
| 6,470,004 | B1 | * | 10/2002 | Murata ....................... 370/347 |

(Continued)

FOREIGN PATENT DOCUMENTS

EP   0 899 920   3/1999

(Continued)

OTHER PUBLICATIONS

Fratta L et al: "PRAS: a MAC protocol for wireless ATM networks" GLOBECOM 'pp, vol. 5, Dec. 5, 1999, pp. 2743-2751, XP010373448.

(Continued)

*Primary Examiner*—Hassan Kizou
*Assistant Examiner*—Gregory Sefcheck
(74) *Attorney, Agent, or Firm*—Frommer Lawrence & Haug LLP; William S. Frommer; Darren M. Simon

(57) ABSTRACT

The present invention relates to a radio transmission method and apparatus for a radio network using a plurality of communication stations. More specifically, the apparatus defines a radio transmission frame based on a signal sent from a control station. A management information transmission region and an information transmission region are set in the defined frame period. A station synchronous section for transmitting a signal for every communication station constituting the radio network is set in the management information transmission region. The length of the station synchronous section is variable in accordance with the number of communication stations in the network. Using this frame format, it is possible to efficiently conduct radio transmission.

28 Claims, 13 Drawing Sheets

U.S. PATENT DOCUMENTS

| | | | |
|---|---|---|---|
| 6,480,473 B1 * | 11/2002 | Chambers et al. | 370/253 |
| 6,545,999 B1 * | 4/2003 | Sugita | 370/347 |
| 6,594,250 B1 * | 7/2003 | Silventoinen et al. | 370/347 |
| 6,747,959 B1 * | 6/2004 | Ho | 370/282 |
| 2002/0018458 A1 * | 2/2002 | Aiello et al. | 370/348 |
| 2004/0028071 A1 * | 2/2004 | Gehring et al. | 370/442 |

FOREIGN PATENT DOCUMENTS

| | | |
|---|---|---|
| EP | 0 932 277 | 7/1999 |
| EP | 0 939 510 | 9/1999 |

OTHER PUBLICATIONS

Jeong D G et al: "IEEE/ACM Transactions On Networking, IEEE Inc. New York, US" IEEE/ACM Transactions On Networking, vol. 3, No. 6, Dec. 1, 1995, pp. 742-751, XP000544178, ISSN: 1063-6692.

* cited by examiner

RADIO TRANSMISSION OF ISOCHRONOUS AND ASYNCHRONOUS INFORMATION IN A NETWORK HAVING A VARIABLE NUMBER OF STATIONS

BACKGROUND OF THE INVENTION

1. Field of the Invention

The present invention relates to a radio transmission method and a radio transmission apparatus which are suitable for transmitting radio signals between various devices to construct a local area network (LAN).

2. Description of the Related Art

A method has been proposed for constructing a radio network wherein the number of communication stations is fixed, e.g. four stations. The network system transmits information using a frame structure. A portion of the frame is allocated as a management information transmission region, wherein information necessary for operating the network is transmitted. Further, a radio transmission frame has been proposed that has a station synchronizing section in the management information transmission region to identify the communication stations in the network (U.S. patent application Ser. No. 09/252,807). By utilizing such a frame structure in a star-type transmission network managed by a central control station, it is possible to construct a network that conducts net-type information transmission.

FIG. 13 shows an example of structure for a radio transmission frame according to the conventional method. In FIG. 13, a transmission frame is defined having a constant transmission frame period 135. A management information transmission region 136 and an information transmission region 137 make up each frame period 135. DLM 131 (Down Link Management) is a down link management information transmission section 138 for frame synchronization at the beginning of the frame. ULM 132 (Up Link Management) is a station synchronous transmission section 139 that directly follows DLM 131. DLM 131 is a down link management region (frame synchronous area) that includes frame synchronous information and ULM 132 is a station synchronous section (node synchronous area).

The station synchronous transmission section 139 respectively allocates a section to each communication station in the network. This sectioned structure prevents signals from a plurality of communication stations from colliding into each other. By using this sectioned structure, a network station can identify the linking state between all of the communication stations in the network simply by receiving all signals except those sent by itself. Further, by reporting this linking state information to each other in the station synchronous transmission section 139 of the next frame, the other communication stations can grasp the linking state of the network.

As shown in FIG. 13, this conventional method, has the maximum number of communications stations in the station synchronous transmission section 139 set to four, thus the length of the ULM is fixed.

That portion of the frame outside the management information transmission region 136 is the information transmission region 137. An isochronous transmission section 140 is located in the first portion of the information transmission region, next to the management information transmission region, as a first information transmission region 133. An asynchronous transmission section 141 is located in the remaining portion as a second information transmission region 134.

In the above-described conventional radio network, there is a problem that when a network is constructed having more fixed stations than actual communication stations, some of the allocated sections are not used. Because the number of sections is fixed, this means that some space in the fixed transmission frame is wasted, even if this limits the information that can be transmitted in the information transmission region 137 of the frame. In addition, any unused sections in the ULM take away from the space which could be used by the asynchronous transmission section 141.

However, this problem cannot be fixed simply by making the number of stations variable. For example, when the information transmission region is disposed next to the management information transmission region, if the length of the management information transmission region is variable based upon the number of communication stations in the network, then the starting position of the information transmission region is shifted. This causes another problem if a communication station relating to this transmission does not notice that the starting position of the information transmission region within the frame has changed, then information in the isochronous transmission section can be lost.

OBJECTS OF THE INVENTION

It is therefore an object of the present invention to provide a radio transmission method and a radio transmission apparatus for optimally constructing a radio transmission frame in accordance with the actual number of communication stations in the radio network.

Other objects and advantages of the invention will in part be obvious and will in part be apparent from the specification and the drawings.

SUMMARY OF THE INVENTION

To attain the above-mentioned object, the invention provides a radio transmission method having the length of a management information transmission region for transmitting management information variable depending upon the number of communication stations in the radio network. Thus, as the number of the communication stations in the network is reduced, more information can be transmitted. In the first embodiment of the invention, the length of the management region is made variable by utilizing a portion of the asynchronous information transmission region without deviating the information transmission region which has a reserved bandwidth. According to this embodiment, the radio transmission frame is constructed such that the asynchronous information transmission region is to some degree proportional to the number of communication stations in the network. Accordingly, the radio transmission frame is constructed such that the reserved bandwidth of the information transmission region is limited in accordance with the number of communication stations. By this method, the radio transmission frame is constructed such that the length of the station synchronous section depends upon the number of communication stations in the network so that the management information transmission region is minimized.

A second embodiment of the invention is a radio transmission method wherein the radio transmission frame is constructed such that the length of the management region is made variable by utilizing a portion of the asynchronous information transmission region without deviating the information transmission region having a reserved bandwidth. According to this method, the radio transmission frame is constructed such that asynchronous information transmission regions are secured to some degree in proportion to increases in the number of communication stations in the network. By this method, the radio transmission frame is constructed such that the reserved bandwidth of the information transmission is limited in accordance with the number of communication stations.

According to the radio transmission apparatus of the invention, a radio network is formed based on the above-described frame structure to transmit information.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENT

Figure 1:
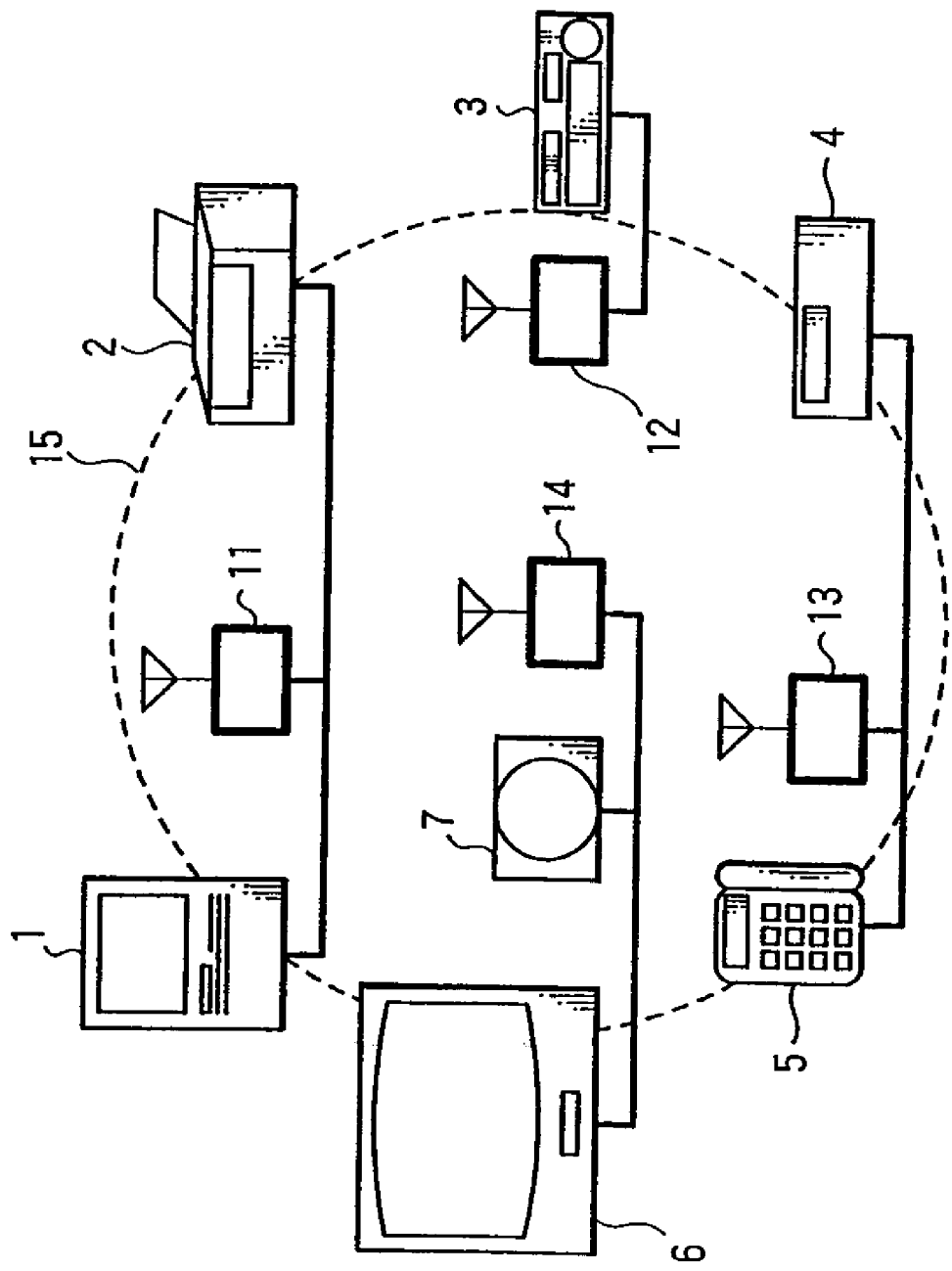
FIG. 1 is an example of a radio network to which a radio transmission method of the present invention can be applied.

The preferred embodiment of the present invention will be explained below. FIG. 1 shows an example of structure for a network system to which the radio transmission method of the present embodiment is applied. As shown in FIG. 1, for example, a personal computer 1 and a printer output apparatus 2 are connected to a radio transmission apparatus 11 through cables or the like. A VTR (video tape recorder) 3 is connected to a radio transmission apparatus 12 through a cable or the like. A telephone 5 and a set top box 4 are connected to a radio transmission apparatus 13 through a cable or the like. A television receiver 6 and a game machine 7 are connected to a radio transmission apparatus 14. The various elements are connected to the radio transmission apparatuses, and the apparatuses constitute a network 15.

Figure 2:
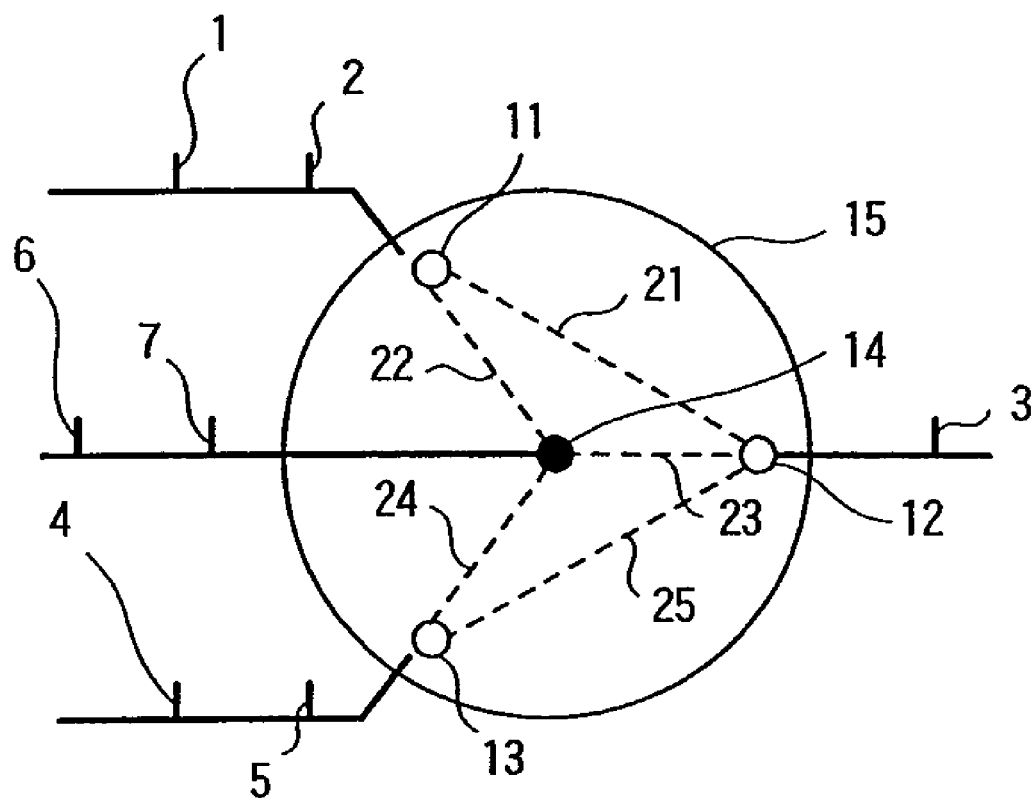
FIG. 2 is a schematic diagram showing a network linking state.

FIG. 2 schematically shows the connection state of the network. In FIG. 2, the radio transmission apparatuses 11, 12 and 13 (shown with hollow circles) constitute a radio network 15 centered on radio transmission apparatus 14 (shown with a solid circle). The personal computer 1 and the printer output apparatus 2 are connected to the radio transmission apparatus 11 (as shown with a solid line). The VTR 3 is connected to the radio transmission apparatus 12 (as shown with a solid line). The telephone 5 and a set top box 4 are connected to the radio transmission apparatus 13 (as shown with a solid line). The television receiver 6 and the game machine 7 are connected to the radio transmission apparatus 14 (as shown with a solid line). In the radio network 15, control station 14 can communicate with all the communication stations 11–13 in the network 15 through lines 22 to 24 (shown with dotted lines).

Note that communication station 11 cannot directly transmit to communication station 13, but can communicate with stations 14 and 12 through lines 22 and 21 (shown with dotted lines). Communication station 12 can communicate with control station 14 and communication stations 11 and 13 through lines 23, 21 and 25. Communication station 13 cannot directly transmit to communication station 11, but can communicate with stations 14 and 12 through lines 24 and 25.

Figure 3:
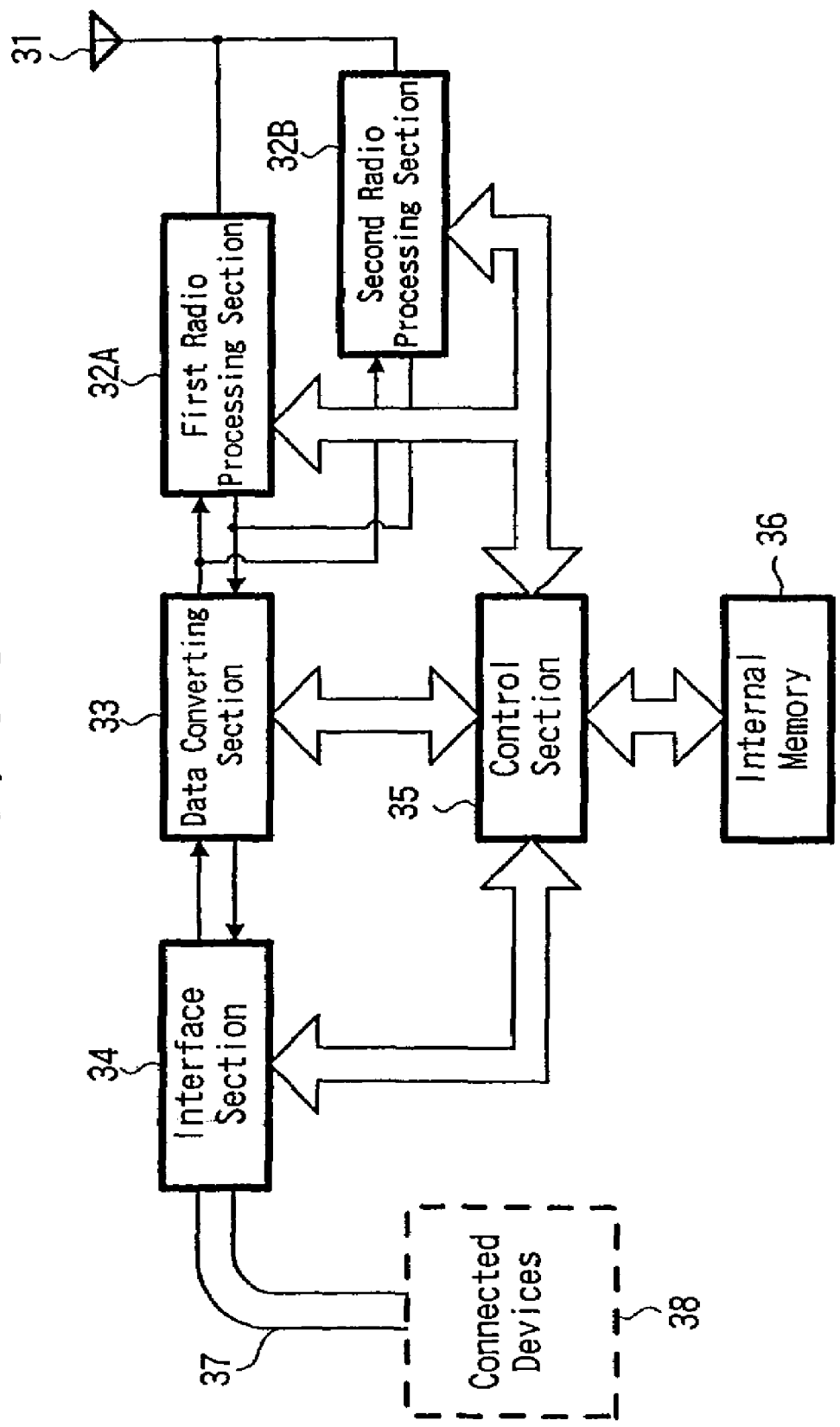
FIG. 3 is an example of the structure of a radio transmission apparatus for each communication station.

FIG. 3 shows an example of structure for radio transmission apparatuses 11 to 14. Here, the radio transmission apparatuses 11 to 14 have basically the same structure, with each apparatus including an antenna 31 for sending and receiving transmissions, and first and second radio processing sections 32A and 32B, that are connected to antenna 31 and perform processing operations for sending and receiving transmissions so that each radio transmission apparatus can communicate with other radio transmission apparatuses. In this embodiment, the radio processing sections 32A and 32B send and receive using a multi-carrier signal, called OFDM (Orthogonal Frequency Division Multiplex), using an extremely high frequency band (e.g., 5 GHz band). In the present embodiment, the transmission signal strength is relatively weak. Thus, for indoor use, radio transmission is limited to a relatively short distance, e.g. on the order of tens of meters.

Radio processing section 32A can process transmissions from communication stations having a reserved bandwidth section in a first isochronous transmission section, which will be described later. Radio processing section 32B can process transmissions in a second asynchronous information transmission section (also described later) based on a transmission control signal from the control station. The radio processing sections are controlled by instructions sent from a control section 35.

The radio transmission apparatus includes a data converting section 33 for decoding the data from signals received by the radio processing sections 32A and 32B, and for encoding the data of signals to be sent from the radio processing sections 32A and 32B. The data decoded by the data converting section 33 is supplied to a processing apparatus 38 through an interface 34. Likewise, the data supplied from the connected processing apparatus 38 is supplied to the data converting section 33 through the interface 34 and encoded. Here, the external interface of interface 34 can send and receive voice and image information or various data information to and from the connected apparatus 38 through; for example, an IEEE1394 formatted high performance serial bus 37. Alternatively; the radio transmission apparatus may be incorporated in the connected apparatus 38. Isochronous information transmitted in IEEE1394 format may be processed in the radio processing section 32A and the asynchronous information may be processed by the radio processing section 32B.

The various devices in the radio transmission apparatus operate under the control of control section 35, that is generally a microcomputer. For instance, when a signal received by the radio processing section 32B is a control signal—such as radio transmission isochronous information—the received signal is supplied to control section 35 through data converting section 33, and the control section sets the various devices in the state indicated by the received control signal.

An internal memory 36 is connected to the control section 35. Internal memory 36 temporarily stores data necessary for controlling communication, the number of communication stations in the network, information concerning how to use the transmission path, slot information reserving bandwidth, and information for designating the radio processing section to be used when information is transmitted.

When control section 35 receives a synchronous signal, the control section judges the timing for receipt of the synchronous signal, sets the frame period based on the synchronous signal, and controls the communication using the set frame period. A control signal—such as radio transmission isochronous information sent from the control section 35 to another transmission apparatus—is supplied to radio processing section 32B through data converting section 33 and transmitted.

Figure 4:
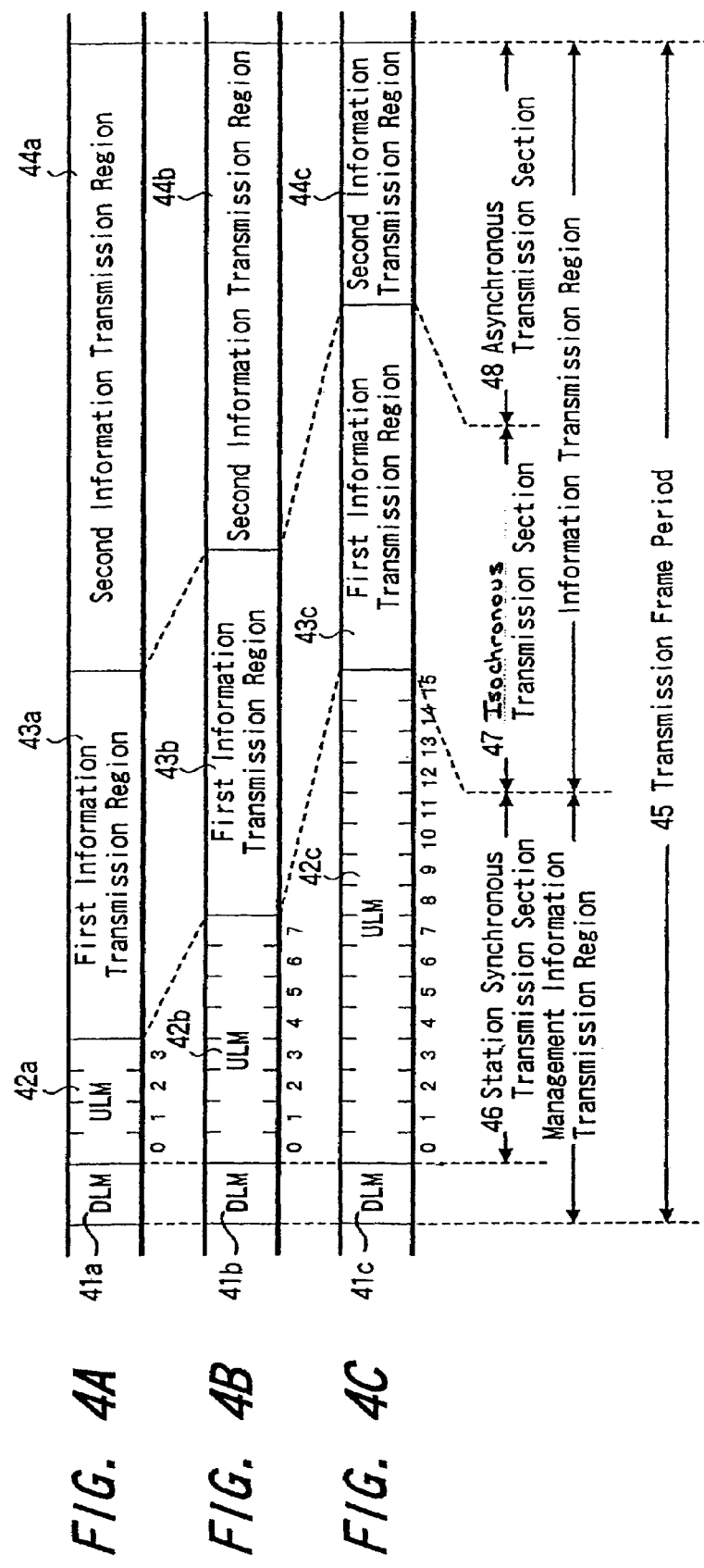
FIG. 4 is an example structure for a radio transmission frame corresponding to the case in which the number of communication stations is variable.
Figure 13:
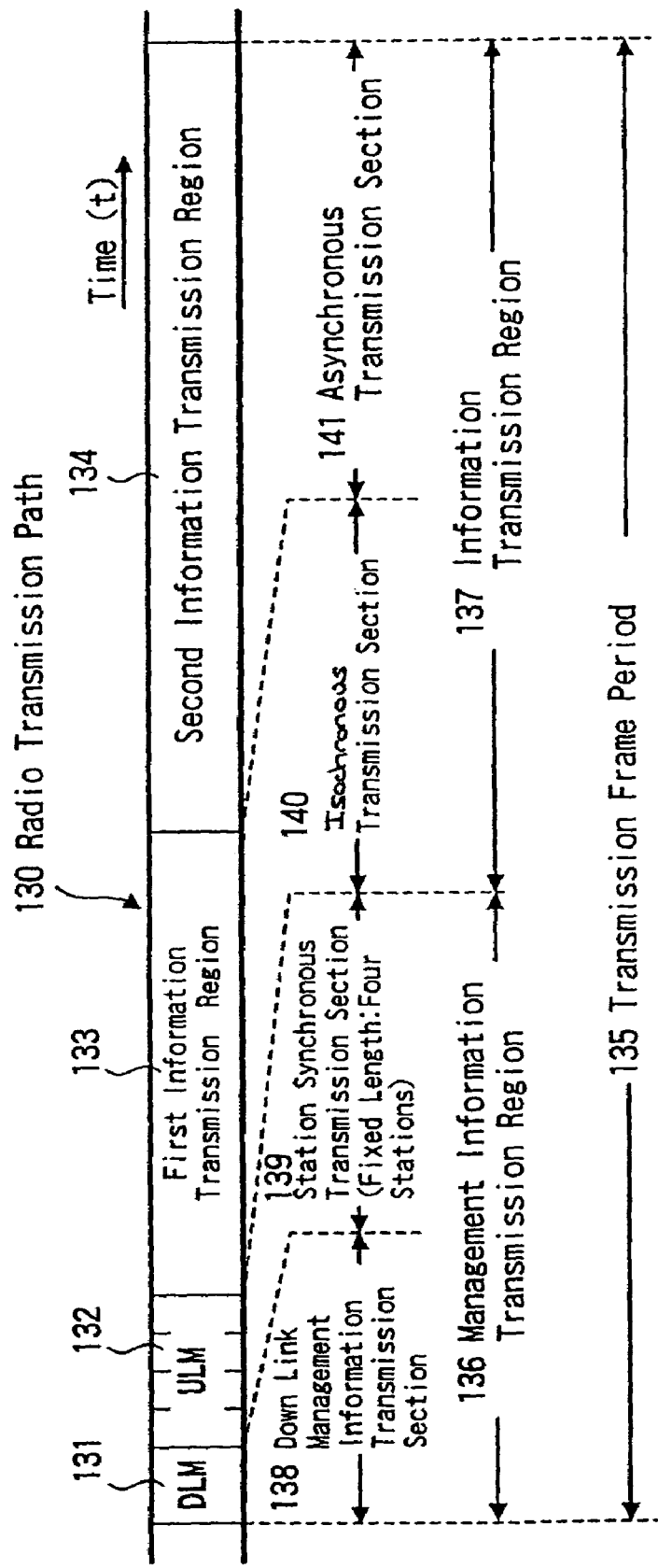
FIG. 13 is an example of structure for a conventional radio transmission frame.

FIG. 4 shows an example of a radio transmission frame corresponding to a network having a variable number of communication stations. In FIG. 4, the transmission frame is defined as having a constant frame period 45. The internal frame structure is defined with respect to the number of communication stations (as shown in FIGS. 4A, 4B and 4C). The frame structure shown in FIG. 4 is different from the conventional structure shown in FIG. 13 in that the management information transmission region is adjusted in accordance with the number of communication stations. Thus, unused sections are eliminated.

In FIGS. 4A, 4B and 4C, DLMs (Down Link Management) 41a, 41b and 41c are disposed from the beginning of the frame, and ULMs (Up Link Management) 42a, 42b and 42c as station synchronous transmission section 46 are disposed next to the DLMs. The DLMs are frame synchronous areas that include frame synchronous information, and the ULMs are node synchronous areas. ULMs 42a, 42b and 42c—of the station synchronous transmission section 46—respectively have allocated regions 0 to 3, 0 to 7 and 0 to 15 which correspond to one region more than the number of currently operating communication stations in the network. This extraneous region is used to identify a new communication station to be added to the network. When any of the constituent communication stations are disconnected from the network, a previously allocated region can be removed from the station synchronous transmission section. This structure prevents signals sent from a plurality of communication stations from colliding. For example, if a communication station receives signals in each of the regions of the station synchronous transmission section 46, the station can determine the linking state between all of the communication stations in the network. Further, this same station can resend the linking state in the ULMs of its transmission so that other stations will know the linking state.

The portion of the frame not occupied by the management information transmission region is occupied by the information transmission region. In the information transmission region, an isochronous transmission section 47 is disposed on the side of the region next to the station synchronous transmission section 46. FIGS. 4A–4C show this region as first information transmission regions 43a, 43b and 43c. An asynchronous transmission section 48 is disposed in the remaining portion of the information transmission region as second information transmission regions 44a, 44b and 44c.

The frame structure shown in FIG. 4 is a basic example of the present embodiment. In the frame structure shown in FIG. 4, the leading edge of isochronous transmission section 47 may deviate if the number of the communication stations is increased. This complicates the control process for network transmissions.

Figure 5:
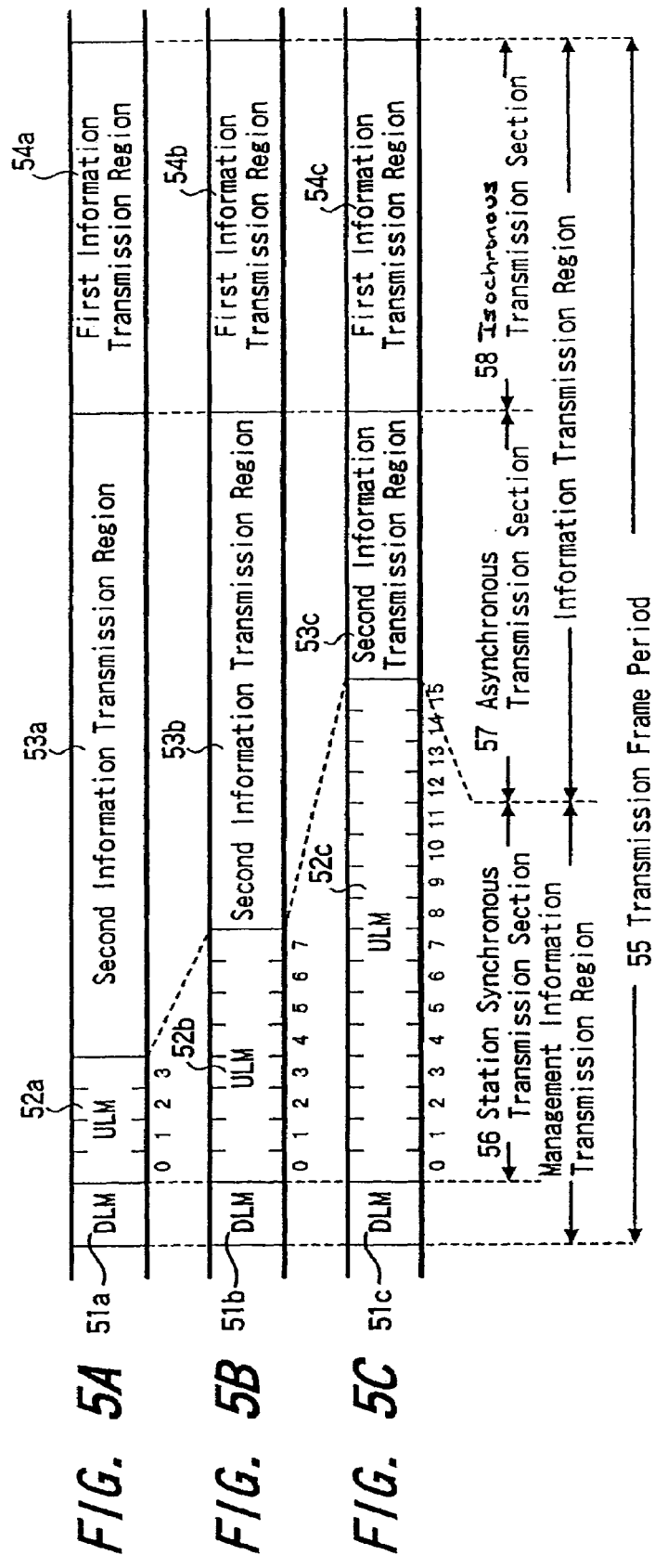
FIG. 5 is an example of structure for a radio transmission frame in which the first information transmission region is fixedly disposed.

FIG. 5 shows an example of a radio transmission frame according to the present invention in which the first information transmission region is fixedly disposed. In FIG. 5, the transmission frame is defined as having a constant frame period 55. The internal frame structure is defined with respect to the number of communication stations (as shown in FIGS. 5A, 5B and 5C). The frame structure shown in FIG. 5 is different from that shown in FIG. 4 in that first information transmission regions 54a, 54b and 54c—constituting the isochronous transmission section 58—are disposed at the end of the frame. Second information transmission regions 53a, 53b and 53c—constituting the asynchronous transmission section 57—are disposed next to station synchronous transmission section 56. With this structure, the leading edge of the isochronous transmission section 58 is fixed irrespective of increases or decreases in the number of communication stations. Thus, control of the network is simplified.

In FIGS. 5A, 5B and 5C, DLMs 51a, 51 b and 51c are disposed from the beginning of the frame, and ULMs 52a, 52b and 52c as station synchronous transmission section 56 are disposed next to the DLMs. ULMs 52a, 52b and 52c—of the station synchronous transmission section 56—respectively have allocated regions 0 to 3, 0 to 7 and 0 to 15 which correspond to one region more than the number of currently operating communication stations in the network. This allocation prevents a plurality of communication stations from sending colliding transmissions.

According to the frame structure shown in FIG. 5, if DLMs 51a, 51b and 51c—as down link management information transmission sections—are not received correctly every time, the second information transmission regions 53a, 53b and 53c—constituting asynchronous transmission section 57—can protrude into the first information transmission regions 54a, 54b and 54c that constitute the isochronous transmission section 58. In this situation, the amount of information that can be transmitted is limited.

Figure 6:
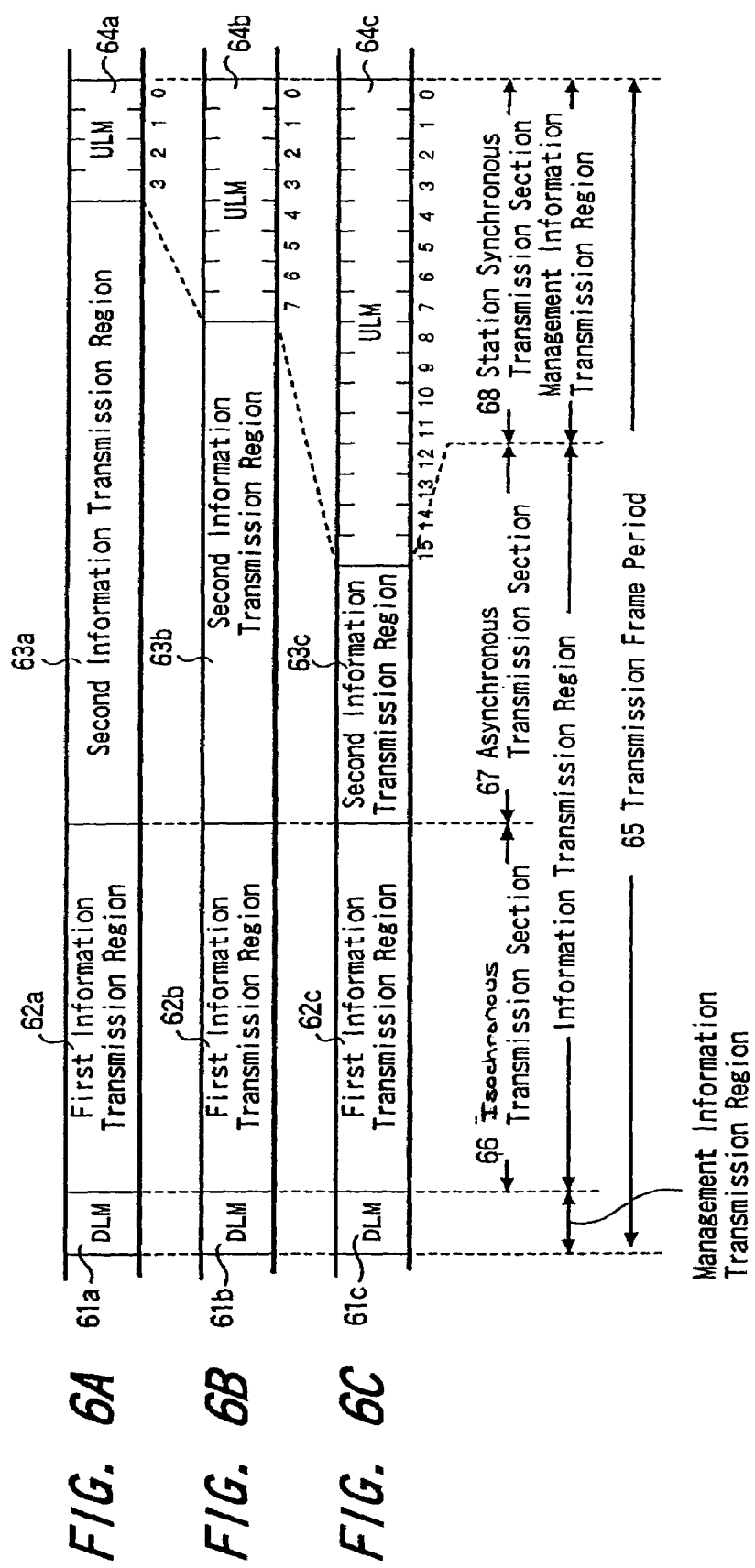
FIG. 6 is an example of structure for a radio transmission frame in which the station synchronous transmission section is disposed at the end of the frame.

FIG. 6 shows another example of the radio transmission frame according to the present invention in which the station synchronous transmission section—which is variable depending upon the number of communication stations—is disposed at the end of the frame. In FIG. 6, the transmission frame is defined as having a constant frame period 65. The internal frame structure is defined with respect to the number of communication stations (as shown in FIGS. 6A, 6B and 6C). The frame structure shown in FIG. 6 is different from that shown in FIG. 4 in that first information transmission regions 62a, 62b and 62c—constituting the isochronous transmission section 66—are disposed next to DLMs 61a, 61b and 61c constituting the down link management information transmission section disposed at the beginning of the frame. Second information transmission regions 63a, 63b and 63c—constituting asynchronous transmission section 67—are disposed after the first information transmission regions. ULMs 64a, 64b and 64c—constituting station synchronous transmission section 68—are disposed at the end of the frame. With this structure, the second information transmission regions 63a, 63b and 63c—constituting the asynchronous transmission section 67—exist behind the first information transmission regions 62a, 62b and 62c. The ULM, which is variable depending upon the number of communication stations, is disposed at the end of the frame. Therefore, the second information transmission region does not protrude into the first information transmission region. Thus, the amount of transmission information is not limited.

Figure 7:
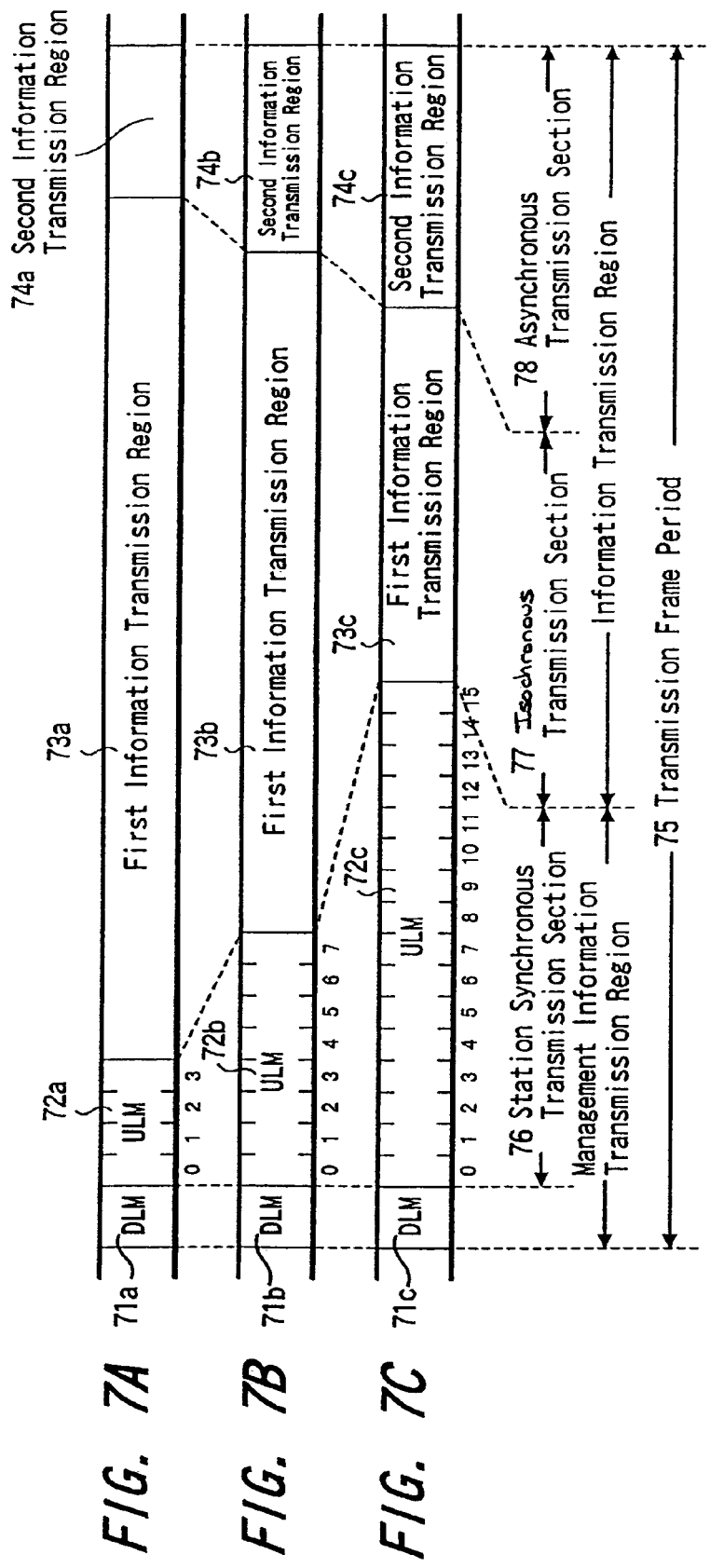
FIG. 7 is an example of structure for a radio transmission frame in which the length of the second transmission region is proportional to the number of communication stations.

FIG. 7 shows another example of the radio transmission frame according to the present invention wherein the second information transmission region is secured at the end of the frame and varies in accordance with the number of communication stations. In FIG. 7, the transmission frame is defined as having a constant frame period 75. The internal frame structure is defined with respect to the number of communication stations (as shown in FIGS. 7A, 7B and 7C). The structure shown in FIG. 7 avoids the situation wherein the second information transmission region is limited even when number of communication stations is increased. This structure protects the transmission efficiency of the asynchronous transmission section 78.

In FIGS. 7A, 7B and 7C, DLMs 71a, 71b and 71c are disposed at the beginning of the frame, and ULMs 72a, 72b and 72c—as station synchronous transmission section 76—are disposed next to the DLMs. Isochronous transmission section 77 is disposed next to station synchronous transmission section 76 as first information transmission regions 73a, 73b and 73c. Asynchronous transmission section 78 is disposed in the remaining portion of the frame as second information transmission regions 74a, 74b and 74c.

The frame structure shown in FIG. 7 is different from that shown in FIG. 4 in that the size of the first information transmission regions 73a, 73b and 73c is reduced as the number of communication stations is increased. This is done to ensure that second information transmission regions 74a, 74b and 74c—which are proportional in length to the number of communication stations—have at least a minimum necessary length.

Figure 8:
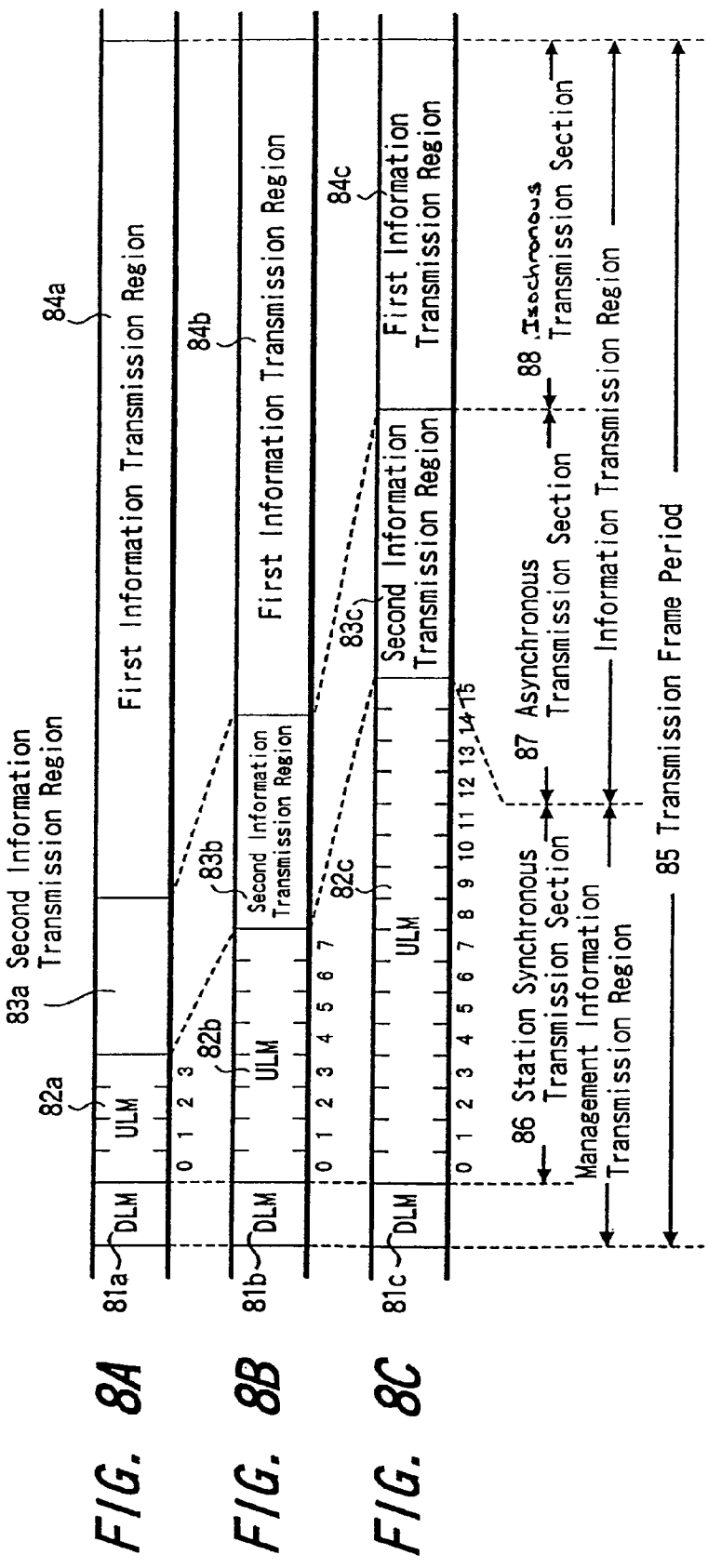
FIG. 8 is another example of structure for a radio transmission frame in which the second transmission region is proportional to the number of communication stations.

FIG. 8 shows another example of the radio transmission frame according to the present invention wherein the second information transmission region is disposed next to the ULMs and varies in accordance with the number of communication stations. In FIG. 8, the transmission frame is defined as having a constant frame period 85. The internal frame structure is defined with respect to the number of communication stations (as shown in FIGS. 8A, 8B and 8C). The structure shown in FIG. 8 avoids the situation wherein the second information transmission region is limited even when the number of communication stations is increased. This structure protects the transmission efficiency of the asynchronous transmission section 87.

In FIGS. 8A, 8B and 8C, DLMs 81a, 81b and 81c are disposed at the beginning of the frame, and ULMs 82a, 82b and 82c—as station synchronous transmission section 86—are disposed next to the DLMs. Asynchronous transmission section 87—as second information transmission regions 83a, 83b and 83c—is disposed next to the station synchronous transmission section 86. Isochronous transmission section 88—as first information transmission regions 84a, 84b and 84c—is disposed in the remaining portion.

The frame structure shown in FIG. 8 is different from that shown in FIG. 5 in that the maximum length which can be allocated as the first information transmission region of the isochronous transmission section 88 is reduced as the number of communication stations is increased. In order to secure at least a minimum length for the second information transmission regions 83a, 83b and 83c, the first information transmission regions 84a, 84b and 84c are correspondingly limited.

Figure 9:
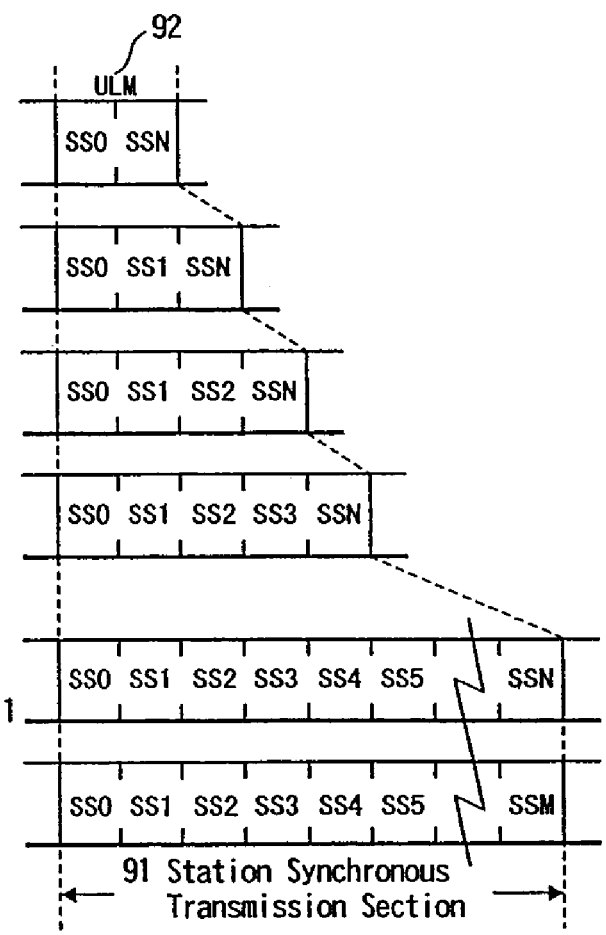
FIGS. 9A–9E show the increase in sections for the station synchronous section in accordance with an increase in the number of communication stations.

FIG. 9 shows that the ULM 92 increases (SS0 to SSM) in proportion to an increase in the number of terminal stations. FIG. 9A shows an example of the ULM of the station synchronous transmission section 91 when only the control station exists. This corresponds to the initial stage when the radio network is being formed. Here, the control station also transfers information of its own between the station synchronous sections, like a general communication station. SS0 is shown as the transmission section of the station synchronous signal corresponding to the control station. The SSN indicates a new synchronous section. In this region a communication station that is newly connected to the radio network sends admission information to the control station. Hence, as shown in FIG. 9B, when a terminal communication station (S1) is incorporated in the network, SS1 is registered as the transmission section for that station. Then, a new station synchronous section SSN is allocated at the end of the ULM. Thus, as shown in FIGS. 9C and 9D, as SS2 and SS3, indicating terminal communication stations (S2, S3), are incorporated in the network, a new station synchronous transmission section SSN is always allocated at the end of the ULM whenever the number of terminal communication stations is increased.

As shown in FIG. 9E, the number of secured new station synchronous transmission sections SSN is smaller by one than the maximum number of communication terminals SSM permitted to be connected to the network. When the maximum of communication terminals SSM are connected to the network, a new station synchronous transmission section SSN is not added. (See FIG. 9F). With this structure, it is possible to prevent an unlimited number of terminal communication stations from being connected to the radio network, and to prevent the transmission efficiency from being lowered even if the number of terminal communication stations is increased.

The operation of the control station, the terminal station and the new station are explained hereinafter. The flowcharts shown in FIGS. 10–12 can be used for any of the examples of the frame structures shown in FIGS. 4 through 8.

Figure 10:
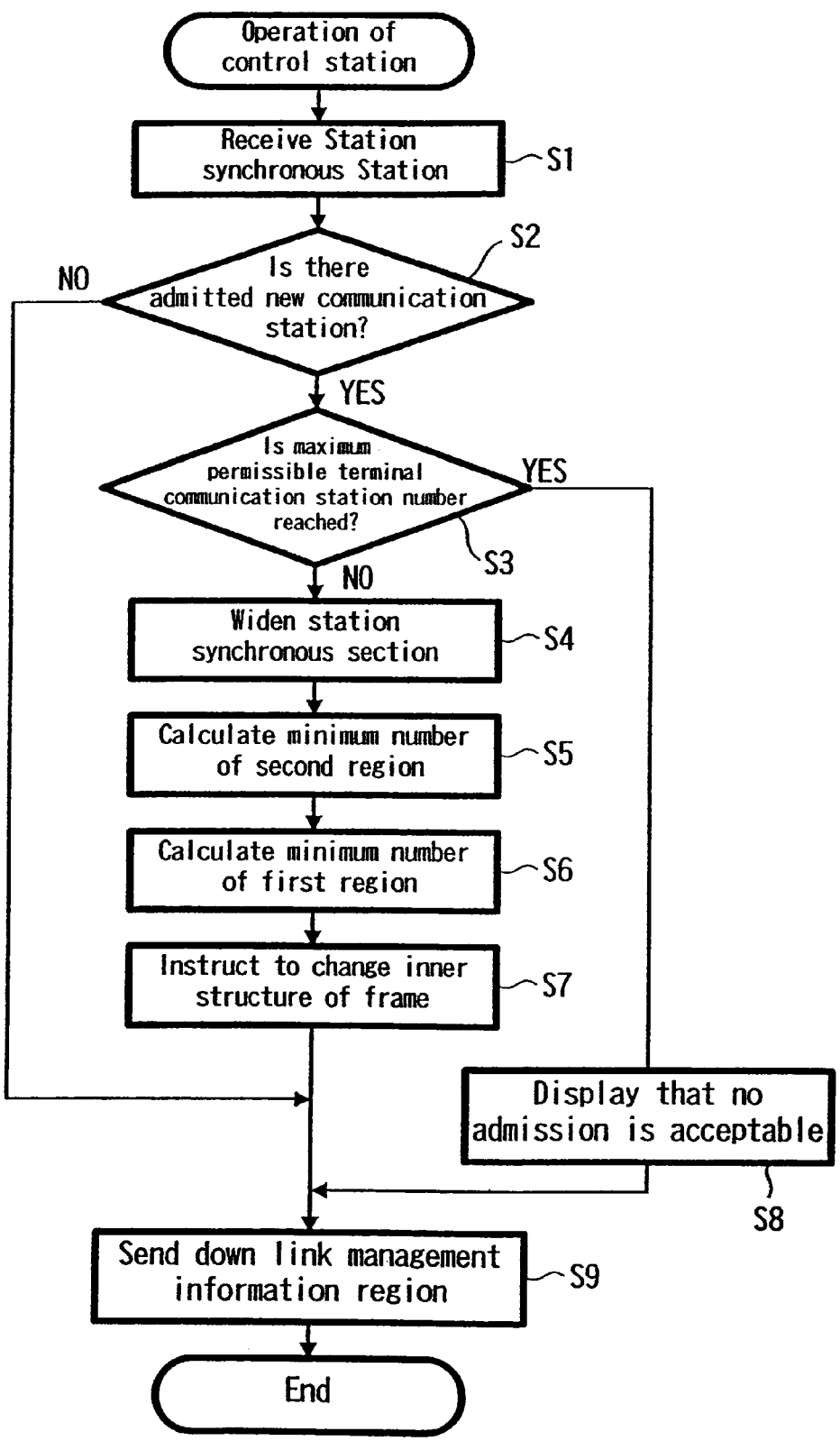
FIG. 10 is a flowchart showing the operation of the control station.

FIG. 10 is a flowchart showing the operation of a control station. In step S1, the station synchronous transmission section is received. In step S2, a determination is made as to whether a new communication station wishes to be admitted to the network. If no new station exists in step S2, the flow proceeds to step S9 where information is sent to all the stations in the network using the down link management information transmission section of the next frame that the previous frame structure is to be used. If there is a new station in step S2, a determination is made as to whether the number of terminal communication stations of the network has reached the maximum number (Step S3). If the maximum has not been reached, then the station synchronous (transmission) section used by the new communication station is widened in step S4. At this time, an admission confirmation signal may be sent to the new communication station using another transmission region.

In step S5, since the number of communication stations constituting the network is increased, the minimum size of the second transmission region is re-calculated. This calculation of the minimum size of the second transmission region is especially relevant for the frame structure examples shown in FIGS. 7 and 8, but the same processing is also carried out in the frame structure examples shown in FIGS. 4–6.

Further, in step S6, the maximum transmission size that can be used as the reservation transmission section in the first transmission region is estimated based on the minimum size of the second transmission region. This calculation is especially relevant in the frame structure examples shown in FIGS. 7 and 8, but the same processing is also carried out in the frame structure examples shown in FIGS. 4 to 6.

To reflect this newly calculated size information, instructions are sent in step S7 that the structure in the frame is to be changed. In step S9 these instructions are sent to the network in the down link management information transmission section of the next frame, thereby completing the procedure.

If it is determined in step S3 that the number of terminal communication stations has reached the maximum, the flow proceeds to step S8 to indicate that a new communication station cannot be admitted. This indication is sent to the network in the down link management information transmission section of the next frame. (See step S9).

Figure 11:
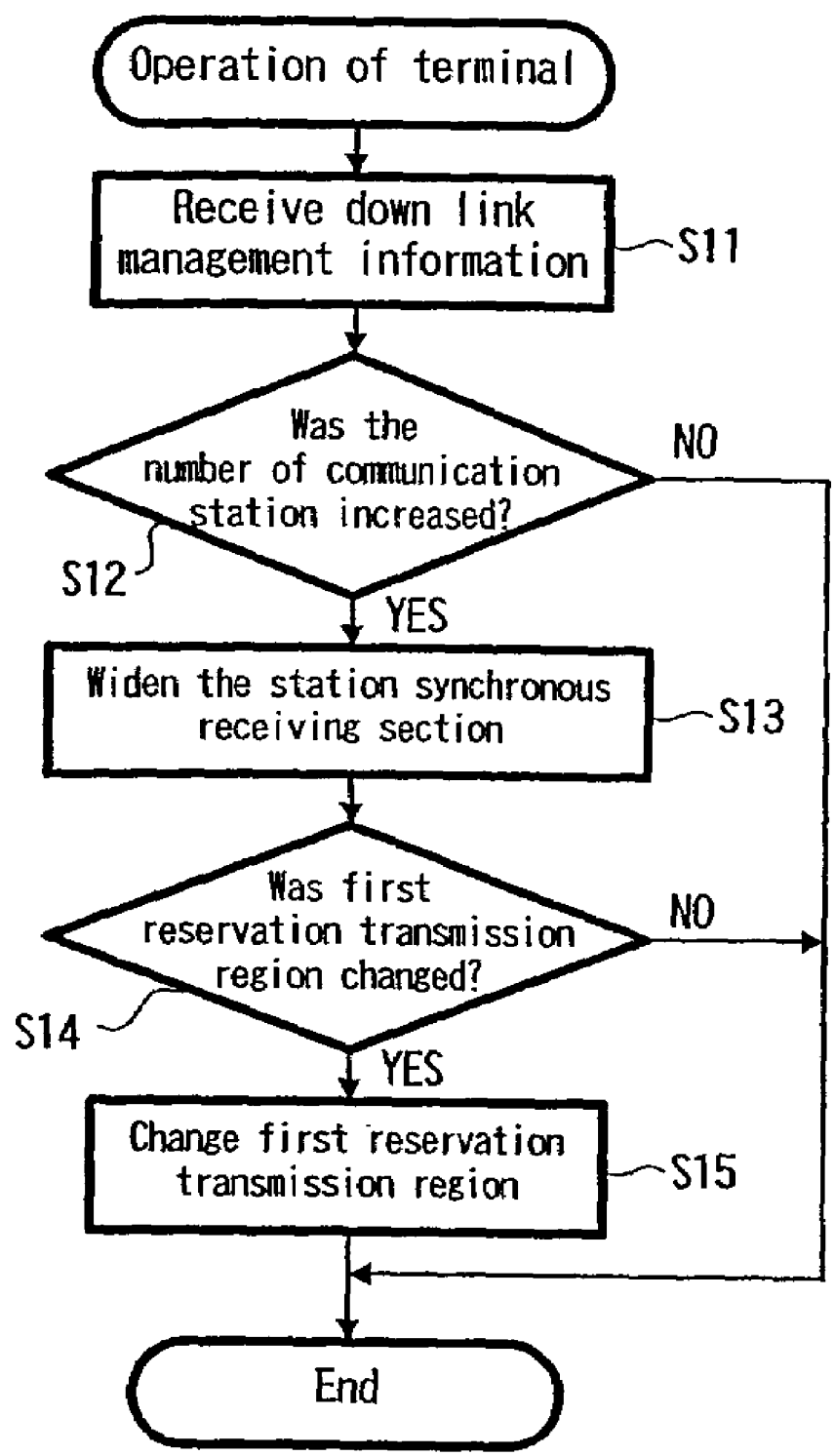
FIG. 11 is a flowchart showing the operation of the terminal station.

FIG. 11 is a flowchart showing the operation of a terminal station. In step S11, a signal is received in the down link management information transmission section from the corresponding network. In step S12, it is determined whether the number of terminal communication stations in the network has increased. If the number of the communication stations has not increased, the procedure is completed. If the number of the communication stations has increased, the station synchronous (transmission) section of the subsequent frame is widened in step S13. In step S14, if isochronous information was sent in the first information transmission region, it is determined that the reservation region has changed. If the reservation region has changed, the region for transmitting the information isochronously is changed in the first information transmission region, and the series of procedure is completed in step S115.

Figure 12:
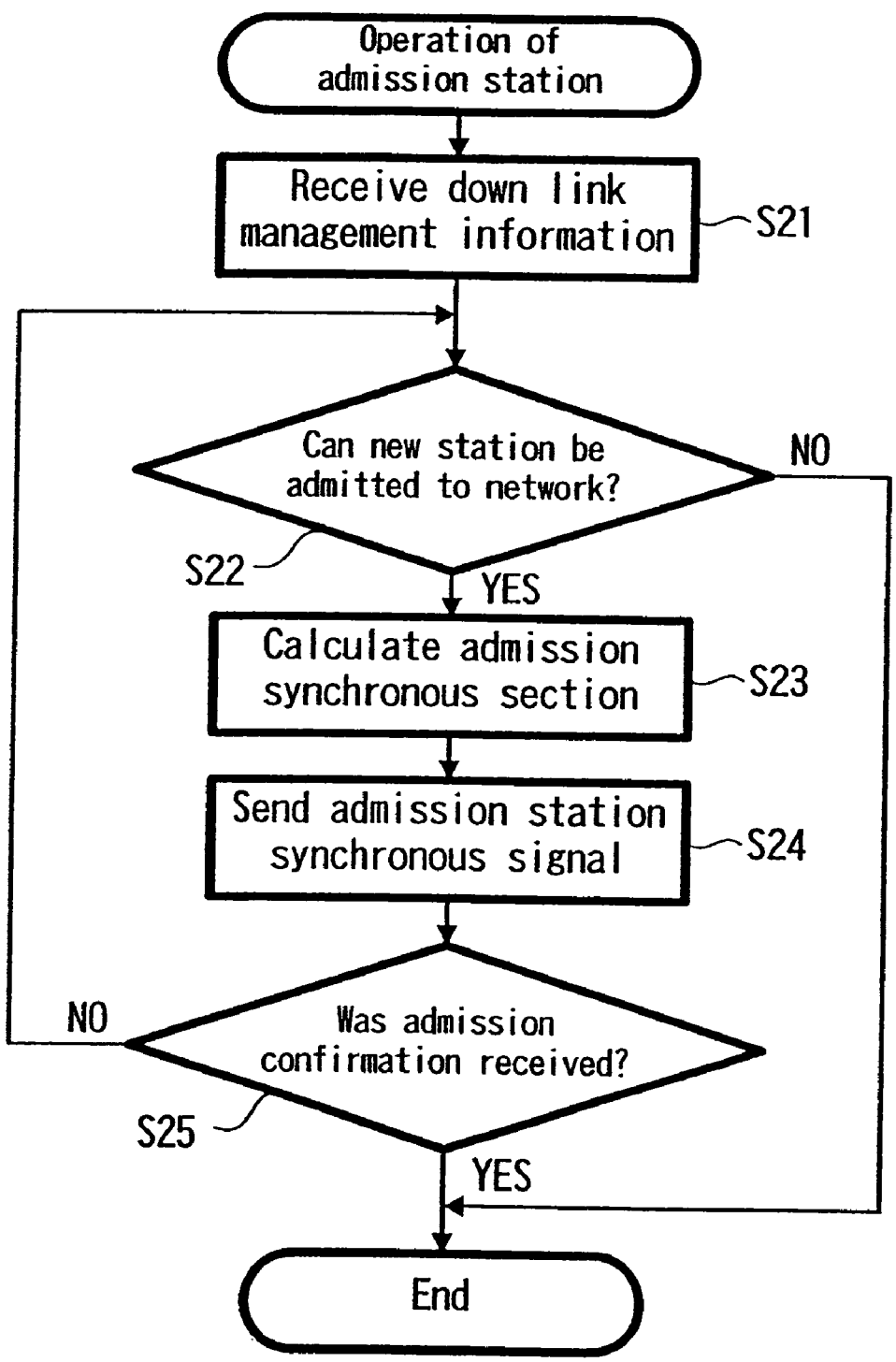
FIG. 12 is a flowchart showing the operation of the admission station.

FIG. 12 is a flowchart showing the operation of a new station. In step S21, the down link management information transmission section is received from the network to which admission is sought. In step S22, it is determined whether it is possible to admit the new station to the network. If it is indicated in the down link management information that the new communication station cannot be admitted, then the procedure is complete. If it is possible to admit the new station, an admission station synchronous (transmission) section (e.g., SSN in FIG. 9A) is calculated by the control station and added to the down link management information. Then, in step S24, a signal is sent by the new station in the admission station synchronous (transmission) section.

In step S25, the station sends a confirmation of admission to the new station. If the confirmation of the admission was received confirming that the new station was admitted, the new station can begin transmission as a terminal communication station of the network. For example, the admission signal may not be received in step S25 if information collided against each other between the plurality of newly admitted communication stations or if the new station is not admitted. The flow proceeds back to step S22, and the judgments and procedures of steps S22 to S25 are repeated until the admission procedure is complete. When a collision occurs, a latency time is randomly set in the communication apparatus. After the latency time elapses, the admission procedure is continued out.

According to the radio transmission method of the present invention, since the station 21 synchronous signal transmission section in the management information transmission region has a length which is variable in accordance with the number of communication stations in the network, the length of the station synchronous section is variable in accordance with the number of communication stations in the network. Thus, the radio transmission frame can be formed such that minimum management information transmission regions are provided. Therefore, the radio transmission frame is formed in a manner that eliminates waste and allows for effective radio transmission.

Further, according to the radio transmission method of the invention, the information transmission region in the frame period is provided, if necessary, with the first information transmission region for transmitting information isochronously and the second information transmission region for transmitting other information asynchronously. Therefore, the radio transmission frame can be formed such that the length of the management region can be made variable by utilizing the asynchronous information transmission region without deviating the starting point of the information transmission region within the frame. In this manner, information can be effectively sent through a high performance serial bus, such as IEEE1394.

Further, according to the radio transmission method of the invention, the radio transmission frame can be formed such that a minimum length asynchronous information transmission region is secured in accordance with increases in the number of communication stations in the network.

Further, according to the radio transmission method of the invention, the radio transmission frame can be formed so that the maximum bandwidth is used in the information transmission region which reserves the bandwidth in accordance with increases in the number of communication stations in the network.

Further, according to the radio transmission method of the invention, it is possible to provide a region in the station synchronous section for transmitting an admission signal for a new communication apparatus requesting admission to the network. The station synchronous section region which sent the admission signal thereafter becomes identified with the newly admitted communication apparatus.

According to the radio transmission apparatus of the present invention, one radio transmission apparatus functions as the control station for the radio network. A region of the station synchronous signal transmission section is specifically allocated for each communication station in the network. The length of the station synchronous signal transmission section is variable in accordance with the number of communication stations in the network. An information transmission region in the frame period consists of a first information transmission region for transmitting information isochronously and a second information transmission region for transmitting other information asynchronously. Therefore, the radio transmission frame can be formed such that the length of the management region can be made variable by reducing the asynchronous information transmission region without impinging upon the reserved bandwidth of the information transmission region. Hence, information flowing through a high performance serial bus such as IEEE1394 can be effectively sent.

Further, according to the radio transmission apparatus of the invention, there is provided means for receiving admission information corresponding to a newly admitted radio transmission apparatus. Thus, the present invention can easily incorporate another radio transmission apparatus into the network.

Further, the radio transmission apparatus of the invention comprises communication processing means for the transmission of radio signals, means for receiving synchronous signals using the communication processing means and for defining a corresponding frame period, and means for specifying a management information transmission region in the frame period, and means for transmitting a station synchronous signal for each station at a designated position in the management information transmission region. In this manner, it is possible to provide a radio transmission apparatus which functions as a terminal communication station in a radio network.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A radio transmission method for a radio network having a plurality of communication stations, comprising the steps of:
    selecting one of said plurality of communication stations as a control station to control transmission between the communication stations in the radio network;
    said control station defining a transmission frame format having a fixed frame period and consisting of a management information transmission region and an information transmission region; wherein said management information transmission region consists of a fixed length down-link management section and a station synchronous section; said station synchronous section for identifying each communication station in the radio network and having a variable length corresponding to the number of communication stations in the radio network; and
    said control station sending the management information transmission region to said plurality of communication stations for use by said radio network to communicate using the fixed transmission frame format;
    wherein said information transmission region consists of a first information transmission region for transmitting information isochronously and a second information transmission region for transmitting other information asynchronously.

2. The radio transmission method according to claim 1, wherein said first information transmission region has a fixed length and precedes said second information transmission region in said information transmission region.

3. The radio transmission method according to claim 2, wherein said first information transmission region follows said down-link management transmission region and said second information transmission region precedes said station synchronous transmission section.

4. The radio transmission method according to claim 1, wherein said first information transmission region has a fixed length and follows said second information transmission region in said information transmission region.

5. The radio transmission method according to claim 1, wherein the length of said second information transmission region is set to a minimum length that is limited by the number of communication stations in the radio network.

6. The radio transmission method according to claim 5, wherein said first information transmission region follows said second information transmission region in said information transmission region.

7. The radio transmission method according to claim 1, wherein information identifying a new communication station in the radio network is added to the station synchronous section.

8. A radio transmission method for a control station of a radio network having a plurality of communication stations, comprising the steps of:
    defining a transmission frame format having a fixed frame period and consisting of a management information transmission region and an information transmission region; and
    setting a station synchronous section in the management information transmission region for identifying each communication station in the radio network, wherein the station synchronous section has a variable length corresponding to the number of communication stations in the radio network; and
    sending the management information transmission region to said plurality of communication stations for use by said radio network to communicate using the fixed transmission frame format;
    wherein said information transmission region consists of a first information transmission region for transmitting information isochronously and a second information transmission region for transmitting other information asynchronously.

9. The radio transmission method according to claim 8, wherein said first information transmission region has a fixed length and precedes said second information transmission region in said information transmission region.

10. The radio transmission method according to claim 9, wherein said first information transmission region follows said down-link management transmission region and said second information transmission region precedes said station synchronous transmission section.

11. The radio transmission method according to claim 8, wherein said first information transmission region has a fixed length and follows said second information transmission region in said information transmission region.

12. The radio transmission method according to claim 8, wherein the length of said second information transmission region is set to a minimum length that is limited by the number of communication stations in the radio network.

13. The radio transmission method according to claim 12, wherein said first information transmission region follows said second information transmission region in said information transmission region.

14. The radio transmission method according to claim 8, wherein information identifying a new communication station in the radio network is added to the station synchronous section.

15. A control station for controlling a radio network having a plurality of communication stations, comprising:
    a controller for defining a transmission frame format having a fixed frame period and consisting of a management information transmission region and an information transmission region; wherein said management information transmission region consists of a fixed length down-link management section and a station synchronous section; said station synchronous section for identifying each communication station in the radio network and having a variable length corresponding to the number of communication stations in the radio network; and
    a radio transmitter for sending and receiving signals having the fixed transmission frame format; the radio transmitter sending the management information transmission region to said plurality of communication stations for use by said radio network to communicate using the fixed transmission frame format;

wherein said information transmission region consists of a first information transmission region for transmitting information isochronously and a second information transmission region for transmitting other information asynchronously.

16. The control station according to claim 15, wherein said first information transmission region has a fixed length and precedes said second information transmission region in said information transmission region.

17. The control station according to claim 16, wherein said first information transmission region follows said down-link management transmission region and said second information transmission region precedes said station synchronous transmission section.

18. The control station according to claim 15, wherein said first information transmission region has a fixed length and follows said second information transmission region in said information transmission region.

19. The control station according to claim 15, wherein the length of said second information transmission region is set to a minimum length that is limited by the number of communication stations in the radio network.

20. The control station according to claim 19, wherein said first information transmission region follows said second information transmission region in said information transmission region.

21. The control station according to claim 15, wherein information identifying a new communication station in the radio network is added to the station synchronous section.

22. A radio transmission network for radio transmission between a control station and a plurality of communication stations, comprising:

said control station for controlling said radio transmission network, comprising:

a first controller for defining a transmission frame format having a fixed frame period and consisting of a management information transmission region and an information transmission region; wherein said management information transmission region consists of a fixed length down-link management section and a station synchronous section; said station synchronous section for identifying each communication station in the radio network and having a variable length corresponding to the number of communication stations in the radio network;

wherein said information transmission region consists of a first information transmission region for transmitting information isochronously and a second information transmission region for transmitting other information asynchronously; and a first radio transmitter for sending and receiving signals having the fixed transmission frame format; the first radio transmitter sending the management information transmission region to said plurality of communication stations for use by said radio network to communicate using the fixed transmission frame format; and at least one communication station controlled by said control station, comprising:

a second radio transmitter for sending and receiving signals having the fixed transmission frame format; and a second controller for transmitting a station synchronous signal identifying the communication station and included at a designated position in said station synchronous section.

23. The radio transmission network according to claim 22, wherein said first information transmission region has a fixed length and precedes said second information transmission region in said information transmission region.

24. The radio transmission network according to claim 23, wherein said first information transmission region follows said down-link management transmission region and said second information transmission region precedes said station synchronous transmission section.

25. The radio transmission network according to claim 22, wherein said first information transmission region has a fixed length and follows said second information transmission region in said information transmission region.

26. The radio transmission network according to claim 22, wherein the length of said second information transmission region is set to a minimum length that is limited by the number of communication stations in the radio network.

27. The radio transmission network according to claim 26, wherein said first information transmission region follows said second information transmission region in said information transmission region.

28. The radio transmission network according to claim 22, wherein information identifying a new communication station in the radio network is added to the station synchronous section.

* * * * *